FIG. I

INVENTOR.
TED W. BIRK

BY Lindsey, Prutzman and Hayes
ATTORNEYS

Jan. 24, 1967  T. W. BIRK  3,299,866
ROTARY INTERNAL COMBUSTION ENGINE
Filed June 15, 1964  8 Sheets-Sheet 2

INVENTOR.
TED W. BIRK
BY Lindsey, Prutzman and Hayes
ATTORNEYS

INVENTOR.
TED W. BIRK

BY Lindsey, Prutzman and Hayes

ATTORNEYS

INVENTOR.
TED W. BIRK

FIG. 15

INVENTOR.
TED W. BIRK

BY Lindsey, Prutzman and Hayes
ATTORNEYS

Jan. 24, 1967  T. W. BIRK  3,299,866
ROTARY INTERNAL COMBUSTION ENGINE
Filed June 15, 1964  8 Sheets-Sheet 7

INVENTOR.
TED W. BIRK

BY Lindsey, Prutzman and Hayes

ATTORNEYS

United States Patent Office 3,299,866
Patented Jan. 24, 1967

3,299,866
ROTARY INTERNAL COMBUSTION ENGINE
Ted W. Birk, P.O. Box 865, Berlin, N.Y. 12022
Filed June 15, 1964, Ser. No. 374,897
24 Claims. (Cl. 123—17)

The present invention relates to internal combustion engines and more particularly to a new and useful rotary internal combustion engine of the type shown in my United States Patent No. 2,878,793, issued March 24, 1959, entitled, Rotary Internal Combustion Engine, and to a new and useful thermodynamic cycle for an internal combustion engine.

A principal aim of the present invention is to provide a new and advanced rotary internal combustion engine and a new and improved thermodynamic process notably useful in a rotary internal combustion engine for providing increased thermal efficiency and for eliminating autoignition and backfiring and incorporating thermodynamically independent phases including an induction phase, a compression phase, a combustion and expansion phase and an exhaust phase, providing for super expansion of the gases of combustion, as to substantially atmospheric pressure, and for combining a controlled portion of a compressed charge of a preceding cycle with an induced charge of a succeeding cycle to give a combination charge of increased temperature and pressure and therefore of increased homogeneity prior to the compression phase of the thermodynamic process.

Another aim of the present invention is to provide in a rotary internal combustion engine of the type having separate charge and power chambers an improved arrangement for transferring a compressed charge from the charge chamber to the power chamber with increased efficiency and which ensures a turbulent homogeneous charge condition in the power chamber for efficient ignition and rapid flame propagation.

A further aim of the present invention is to provide an improved rotary internal combustion engine having distinct and separate induction, compression, combustion and exhaust phases which are synchronized for smooth engine operation and maximum engine efficiency and which provide for highly efficient conversion of the energy of combustion into mechanical power.

Another aim of the present invention is to provide a new and improved arrangement for maintaining peripheral sealing contact between a rotary piston and its operating chamber wall.

A further aim of the present invention is to provide an improved rotary internal combustion engine having an economical and compact assembly of parts which provide a high degree of reliability over a long service life.

A still further aim of the present invention is to provide an improved rotary internal combustion engine having an intake system providing efficient intake of a fuel and air charge and an exhaust system providing for discharging the spent gases with minimum back pressure and noise.

Another aim of the present invention is to provide a rotary internal combustion engine which may be readily balanced for the elimination of excessive dynamic vibrations.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
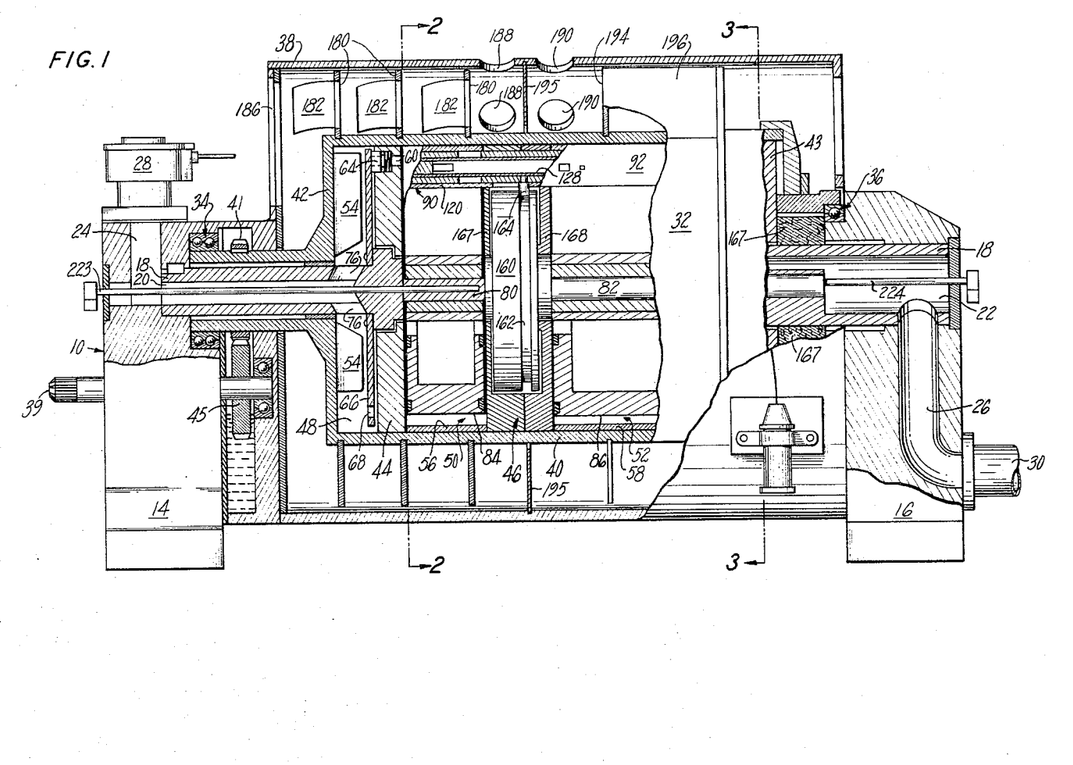
FIG. 1 is a longitudinal side elevation view, partly broken away and partly in section, of an embodiment of a rotary internal combustion engine incorporating the present invention.

Referring now to the drawings in detail, an embodiment of the rotary internal combustion engine of the present invention is shown in FIG. 1 having a stationary engine frame 10 with a pair of upstanding stanchions 14, 16. In the embodiment of FIG. 1 an engine crankshaft 18 is suitably fixed to the stanchions 14, 16 and the cylindrical end portions of the crankshaft 18 are provided with axial passages 20, 22 having communication with stanchion passages 24, 26, respectively, for fluid connection to a carburetor 28 and to an exhaust conduit 30, respectively. An engine casing or rotor 32 is rotatably mounted coaxially with the crankshaft 18 on the frame stanchions by suitable end bearing assemblies 34, 36 and on the crankshaft 18 by an intermediate bearing assembly 37 (FIG. 4), and is enclosed by a generally cylindrical outer housing 38 fixed to the frame stanchions. The rotor 32 is suitably connected to an output shaft 39 by a pair of intermeshing spur gears 41, 45 affixed to the rotor and to the output shaft, respectively.

The engine casing or rotor 32 comprises a cylindrical housing 40 having a fixed end wall 42, an axially detachable end wall 43 and a pair of intermediate partitions or separators 44, 46, preferably snugly received within the housing for common rotation therewith, and which divide the engine casing into a mixing and supercharging or intake chamber 48, a charge chamber 50 and a power chamber 52. Impeller blades 54 are fixed to the end wall 42 for generally radial extension within the mixing and supercharging chamber 48 for increasing the volumetric efficiency of the induction phase of the engine. Hardened liners 56, 58 are provided in the chambers 50, 52, respectively, to provide generally cylindrical bearing surfaces and to accurately space the radial walls of the charge and power chambers.

Figure 5:
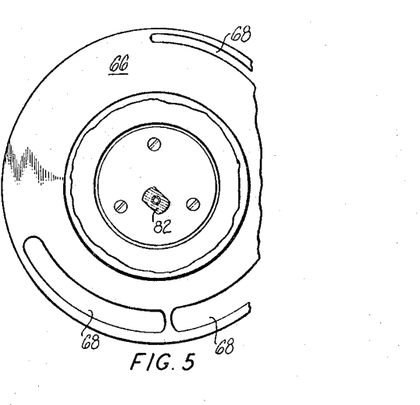
FIG. 5 is a fragmentary transverse section view of the crankshaft assembly taken along line 5—5 of FIG. 4.
Figure 8:
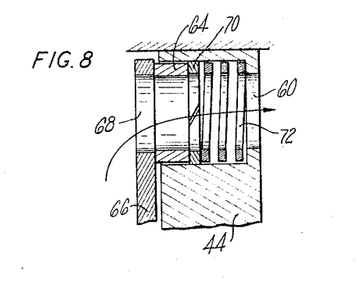
FIG. 8 is an enlarged fragmentary section view showing the intake valve arrangement of the rotary engine.

The intermediate partition 44 is suitably fixed within the housing 40, as by machine screws (not shown), extending radially through the housing, and, as best seen in FIG. 8, is provided with an axial intake passage 60 enlarged for slidably receiving a bushing 64 that is engageable with a stationary intake valve plate 66 suitably fixed to the crankshaft 18 adjacent the rotor partition 44 and having circumferentially extending intake openings 68 (FIG. 5). A ring 70 provides a seal for the intake passage 60 and a compression spring 72 maintains the bushing 64 in sealing engagement with the intake valve plate 66. Accordingly, a fuel-air charge is conveyed from the carburetor 28 through the intake passages 24, 20, through a pair of radial openings 76 in the crankshaft, which are preferably vertically opposed to prevent pooling of fuel in the intake passage 20, to the mixing and supercharging chamber 48 and, in appropriate sequence, the fuel air charge is conveyed via the intake openings 68 and intake passage 60 to the charge chamber 50.

A pair of rotary pistons 84, 86 are rotatably mounted on a pair of axially spaced and diametrically offset crank portions 80, 82 of the crankshaft for operation in the charge and power chambers 50, 52 and in axial sealing engagement with the partitions 44, 46 and the partition 46 and the rotor end wall 43, respectively. A pair of vanes 94, 96 are pivotally mounted on a pair of axially aligned pivots 90, 92 projecting radially inwardly from the rotor housing and are dimensioned to extend the full axial width of the chambers 50, 52. For operatively connecting the vanes 94, 96 to the eccentrically mounted rotary pistons, the vanes are provided with parallel bearing surfaces 98, 100 in sliding engagement with co-operating parallel bearing surfaces on the rotary pistons 84, 86. Therefore, the vane and pivot in each chamber in cooperation with the associated rotary piston function to divide the chamber into two portions with the chamber 50 being divided into an induction chamber 102 in communication with the intake passage 60 and a compression chamber 104; and with the chamber 52 being divided into an exhaust chamber 106 and a combustion chamber 108. The rotary piston 86 is provided with a radial opening 110 for connecting the exhaust chamber 106 with a central collector chamber 112 having communication with the exhaust passage 22 in the crankshaft, and a suitable spark plug 109 is mounted on the casing 40 for igniting the charge in the combustion chamber in appropriate sequence, for which purpose a stationary spark plug terminal 111 is mounted on the motor housing 38 for energizing the rotating spark plug during an ignition timing range.

Figure 11:
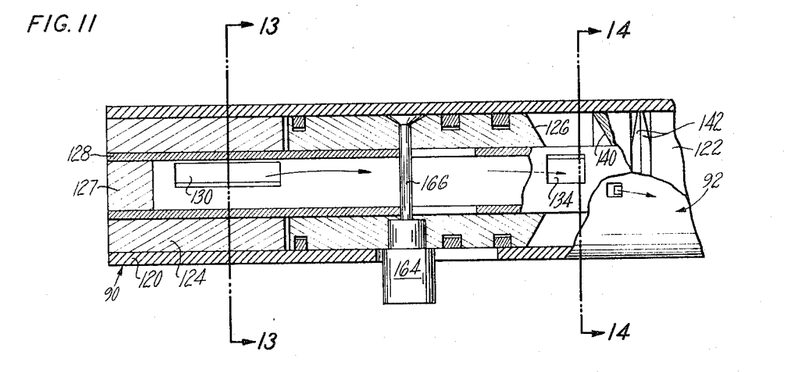
FIG. 11 is an enlarged fragmentary longitudinal section view showing a transfer valve of the engine in its fully retracted position.
Figure 12:
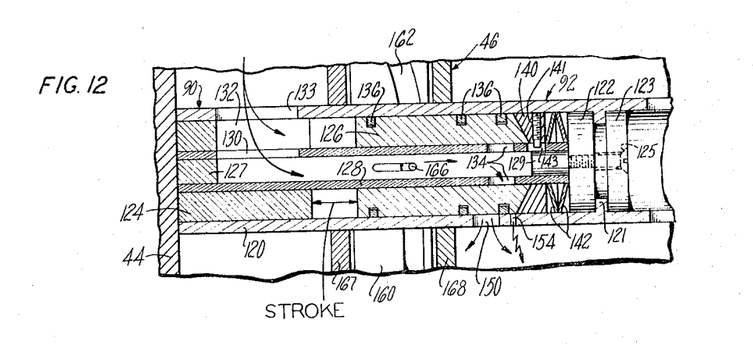
FIG. 12 is an enlarged fragmentary longitudinal section view showing the transfer valve in its fully extended position.
Figure 13:
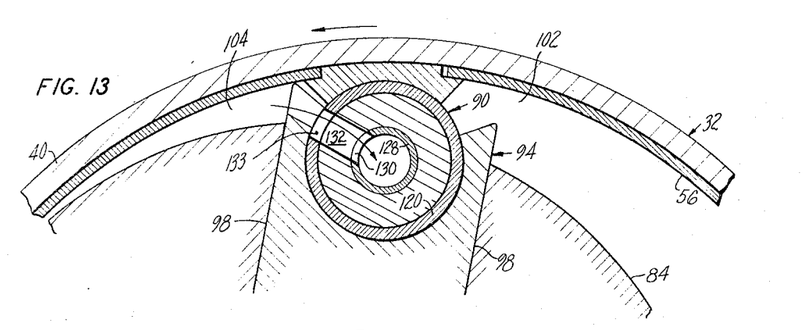
FIG. 13 is a fragmentary transverse section view taken substantially along line 13—13 of FIG. 11.

Referring to FIGS. 11 and 12, the axially aligned vane pivots 90, 92 are shown formed by a cylindrical sleeve 120 which extends from the rotor partition 44, through an opening in the partition 46, to the end wall 43. A cylindrical plug 122 is received in the sleeve 120 in engagement with an inner annular shoulder 121 and is retained thereagainst by a cap 123 and a machine screw 125 supported by the cap and threaded to the plug 122. A sleeve 124 is mounted within the sleeve 120 adjacent the partition 44, and a transfer valve sleeve or piston 126 is reciprocably mounted within the sleeve 120 intermediate the plug 122 and sleeve 124.

A fixed transfer tube 128 is disposed within the aligned bores of the sleeve 124 and the transfer valve piston 126 in abutment with the partition 44 and plug 122 and is provided with end plugs 127, 129, the plug 129 being integrally formed in the end of the cylindrical plug 122. The transfer tube has an inlet port 130 in communication with the compression chamber 104 via a slot opening 132 in the sleeve 124 and an opening 133 in the sleeve 120 and a pair of diametrically opposed outlet ports 134 through which the charge transfer to the combustion chamber portion is controlled in appropriate sequence by the transfer valve piston 126. The transfer valve piston 126 may be provided with suitable sealing rings 136, and an end cap 140 is slideably mounted within the sleeve bearing 120 and on the transfer tube 128 to enclose the operating chamber of the transfer valve piston 126, the end cap 140 preferably being provided with a stop screw 141 received in an axial slot 143 in the transfer tube 128 for limiting the freedom of movement of the end cap. A pair of opposed Belleville springs 142 interposed between the end plug 122 and the cap 140 provide for cushioning the engagement of the piston with the end cap and for ensuring complete transfer of the charge from the piston operating chamber, for which purpose the transfer piston and cap 140 may be provided with complementary frustoconical end faces.

Figure 4:
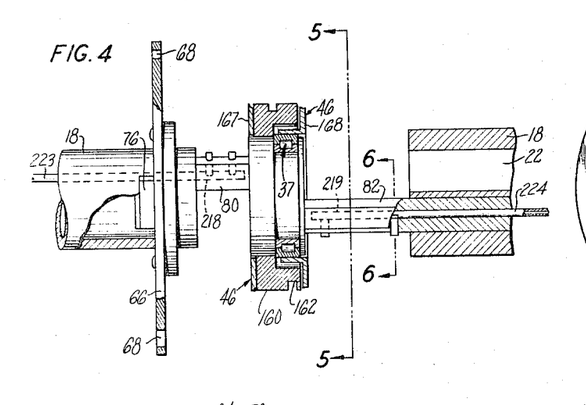
FIG. 4 is an enlarged fragmentary longitudinal view showing the crankshaft assembly of the engine in more detail.
Figure 14:
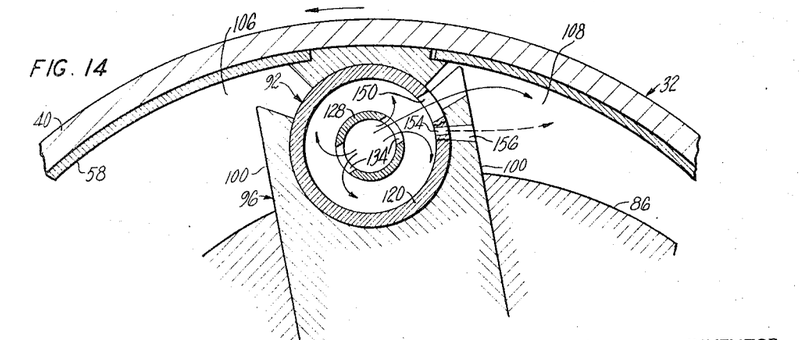
FIG. 14 is a fragmentary transverse section view taken substantially along line 14—14 of FIG. 11.

A primary discharge port 150 in the sleeve bearing 120 is dimensioned for transferring a major portion of the charge to the combustion chamber 108, for which purpose the transfer valve piston 126 is maintained in its retracted or transfer position shown in FIG. 11 for the major portion of the transfer interval. The primary discharge port 150 remains in communication with the outlet ports 134, preferably until a few degrees prior to ignition, whereupon charge transfer through the outlet ports 134 and through the primary port 150 is terminated by the valve piston 126. Thereafter, the trapped portion of the charge remaining in the piston operating chamber between the outlet ports 134 and the cap 140 is discharged into the combustion chamber 108 through a secondary or jet discharge port 154, preferably just prior to ignition, to increase the turbulence in the combustion chamber and thereby increase the thermal efficiency of combustion. Referring to FIG. 14, the major portion of the charge is discharged through the primary discharge port 150 into the combustion chamber adjacent the chamber liner 58 and the power vane 96 is provided with a passage or nozzle 156 for timely alignment with the secondary discharge port 154 for directing the jet discharge preferably into the zone of the spark plug either directly or by deflecting the jet charge off the cylinder wall. Referring to FIGS. 1, 4 and 11, the transfer valve piston 126 is reciprocated by a cam plate 160 fixed to the crankshaft 18 between a pair of plates 167, 168 forming the partition 46. The cam plate 160 is provided with a peripheral camming slot 162 for receiving a follower 164 rotatably mounted on a pin 166 fixed to the transfer valve piston and received within suitable slots in the sleeve 120 and the transfer tube 128. The cam plate is thereby adapted to reciprocate the transfer valve 126 for initiating and terminating the charge transfer in appropriate timed sequence, and as best seen in FIG. 12, the force resulting from the differential pressure on the ends of the transfer valve will assist the cam in providing rapid valve closing.

Figure 3:
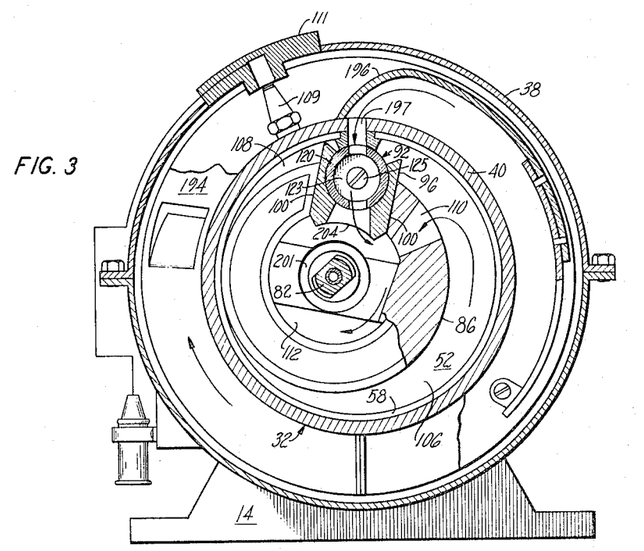
FIG. 3 is a transverse section view of the power section of the engine taken substantially along line 3—3 of FIG. 1.

In operation an unheated wet charge is admitted to the induction chamber 102 while the rotary piston 84 simultaneously compresses a previously induced charge in the compression chamber 104. A work charge portion of the compressed charge is timely transferred to the combustion chamber 108 during the latter part of the compression phase by operation of the transfer valve piston 126 and with complete transfer of the work charge, including the secondary or jet discharge, being completed prior to ignition. Concomitantly, the exhaust resulting from the combustion and expansion of a prior charge is discharged through the radial passage 110 (FIG. 3) in the rotary piston 86 to the exhaust conduit 30 via the collector chamber 112 and the passages 22, 26, for which reason the passage 22 may be insulated in part by asbestos packing 167.

Figure 2:
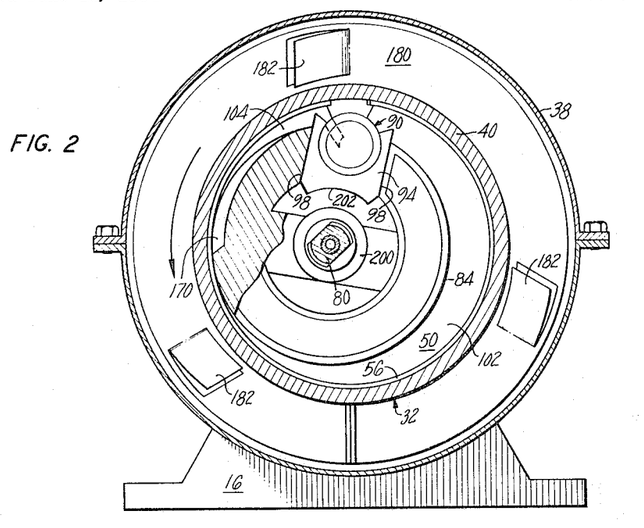
FIG. 2 is a transverse section view of the charge section of the engine taken substantially along line 2—2 of FIG. 1.

After the transfer valve 126 has moved to terminate the flow through the outlet ports 134 in the transfer tube 128 and a succeeding charge has been inducted through the intake opening 60, the remaining compressed charge in the compression chamber 104 is returned to the induction chamber 102 by means of a peripheral slot 170 in the rotary piston 84 (FIG. 2), the returned charge thereby mixing with the induced charge to form a combined charge with increased pressure, temperature and turbulence with resulting improved fuel atomization without a corresponding decrease in the volumetric efficiency of the induction phase of the engine cycle. Thus it can be seen that by controlling the temperature of the charge section with the cooling air, the temperature and pressure of the returned charge can be increased or decreased and thereby increase or decrease the effective compression ratio of the engine without reducing the volumetric efficiency of the engine.

The rotor casing 40 is provided with a plurality of axially spaced external fins 180 which function in part to strengthen the casing and which are cut out to form blades 182 for drawing cooling air through an axial inlet opening 186 formed in the engine housing 38 and direct it about the charge section of the casing to radial outlet openings 188 formed in the housing. Similar fins 194 provide for drawing cooling air through radial inlet openings 190 in the engine housing and direct it about the power section of the rotor, there being an intermediate radial baffle 195 fixed to the housing to separate these cooling air systems to allow for independent control of the temperature of the two sections of the rotor. A shrouded scoop 196 (FIG. 3) mounted on the rotor casing is provided for forcing cooling air inwardly through a radial passage 197 in the portion of the sleeve 120 forming the power vane pivot 92 to the exhaust collector chamber 112, the scoop 196 preferably being adjustable for varying the cooling air pressure within the collector chamber. As a result, the cooling air mixes with engine exhaust to cool the engine exhaust and thereby reduce the exhaust back pressure to dampen the pressure fluctuations in the exhaust and thereby lower the exhaust noise level.

The rotary pistons 84, 86 are maintained in sliding engagement with the combustion chambers liners 56, 58, respectively, throughout the full 360° of rotation of the rotor except for the angular interval during which the vane pivots 90, 92 pass through the lines of contact of the rotary pistons with the liners, through which angular interval of the central hubs 200, 201 of the pistons engage the arcuate surfaces 202, 204 of the compression and power vanes 90, 92, respectively, to ensure balanced rotor movement and smooth withdrawal of the rotary pistons from and recontact with the liners 56, 58.

Figure 6:
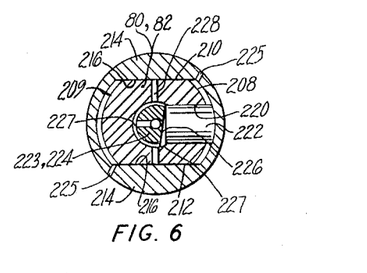
FIG. 6 is an enlarged transverse section view of the crankshaft assembly taken substantially along line 6—6 of FIG. 4.
Figure 7:
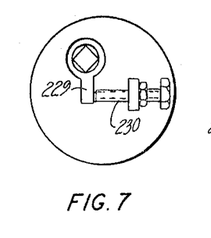
FIG. 7 is an enlarged end view of the crankshaft assembly.

Referring now to FIGS. 4 and 6, the cranks 80, 82 of the crankshaft 18 are provided with diametrically opposed cylindrical surface portions 208, 209 and intermediate diametrically opposed parallel flat bearing surfaces 210, 212. Journal sleeves 214 are received on the cranks to provide journals for the rotary pistons and are provided with inner flat bearing surfaces 216 in engagement with the crank bearing surfaces 210 to enable the journal sleeves and therefore the rotary pistons to be radially adjusted to maintain appropriate sealing engagement with the liners 56, 58. The crankshaft 18 is provided with axially extending bores 218, 219 coaxial with the cranks 80, 82, and the cranks are provided with radial bores 220 communicating with the axial bores and receiving pistons 222 having outer arcuate faces engageable with the crank journal sleeves. Torsion shafts 223, 224 are mounted within the axial bores 218, 219, respectively, and are formed with flats 226 adapted to abut the inner faces of the pistons 222 for radial adjustment of the pistons and therefore angular adjustment of the crank journals. Accordingly, by appropriate angular adjustment of the torsion shafts 223, 224, which adjustment is made through levers 229 (FIG. 7) fixed to the outer ends of the shafts and by adjustment screws 230 mounted on end plates of the crankshaft, the rotary pistons 84, 86 may be maintained in appropriate sealing engagement with the chamber liners. Additionally, the torsion shafts 223, 224 may be conveniently provided with axial and radial lubricant passages for supplying lubricant via a peripheral slot 227 on the torsion shaft and radial bores 228 in the crankshaft to the bearing surfaces 210, 216 and via radial bores 225 in the journal sleeve to the rotary pistons.

Figures 9, 10:
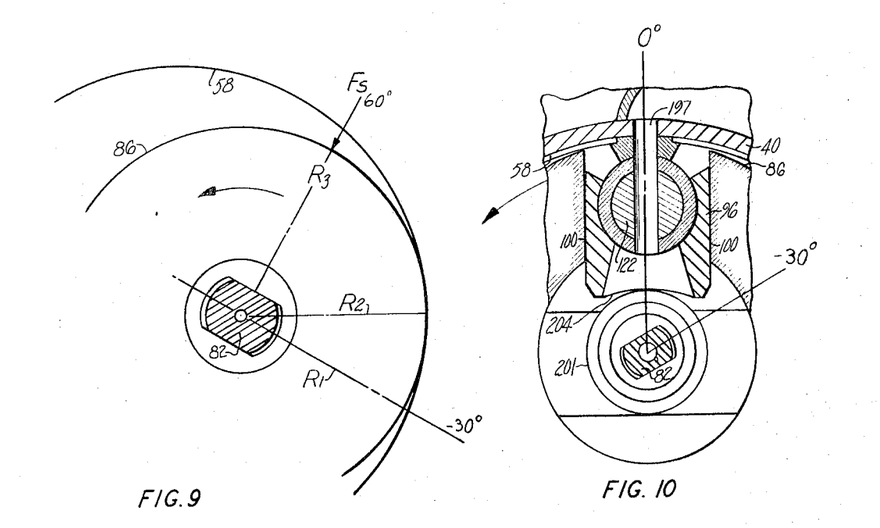
FIG. 9 is an enlarged fragmentary transverse section view, partly shown diagrammatically, of the power section of the engine of FIG. 1.
FIG. 10 is an enlarged fragmentary transverse section view of the power section, showing the power piston of the rotary engine in a "top dead-center position"

Because of the pressure imbalance on the rotary pistons 84, 86 due to the pressure differential between the two chamber portions of each piston operating chamber, the summation of pressure forces on the pistons will provide a resultant generally radial force which varies in direction and magnitude. With the sealing arrangement described, it is preferred that these resultant forces, particularly the resultant force on the power piston 86 resulting primarily from the combustion pressure in the combustion chamber 108, do not substantially affect the sealing engagement of the pistons with the piston liners and thereby reduce the effectiveness of the fluid seal or increase the piston and liner wear and/or frictional resistance. For this reason, the crankshaft crank portions 80, 82 are preferably positioned for maintaining the optimum sealing pressure, and for example so that the direction of adjustment of the journal sleeve 214 is approximately perpendicular to the vector of the resultant force of greatest magnitude. For example, as shown somewhat diagrammatically in FIG. 9, the crank 82 of the power piston 86 is disposed so that the direction of adjustment of the piston is accomplished along a radial $R_1$ angularly offset from the radial $R_2$ through the line of sealing contact in the angular direction opposite the direction of rotation. Assuming that ignition would occur such that the maximum resultant force $F_s$ resulting from the pressure of combustion is obtained with the center line of the power vane pivot 92 displaced 120° from the radial $R_2$, the vector of the resultant force $F_s$ would be on a radial $R_3$ angularly offset substantially 60° from the radial $R_2$ and therefore 90° from the radial $R_1$. Accordingly, the maximum resultant force would not affect the sealing engagement of the power piston 86 with the chamber liner 58, and as the rotor continues its angular movement the decreasing resultant force will act on the piston along a radial which will effect an increase in the sealing engagement.

Referring now to FIGS. 15–19, another embodiment of the rotary internal combustion engine of the present invention comprises an engine frame 301 having a pair of upright stanchions 302, 304, and a generally cylindrical housing 308 secured to the frame between the upright stanchions.

Figure 15:
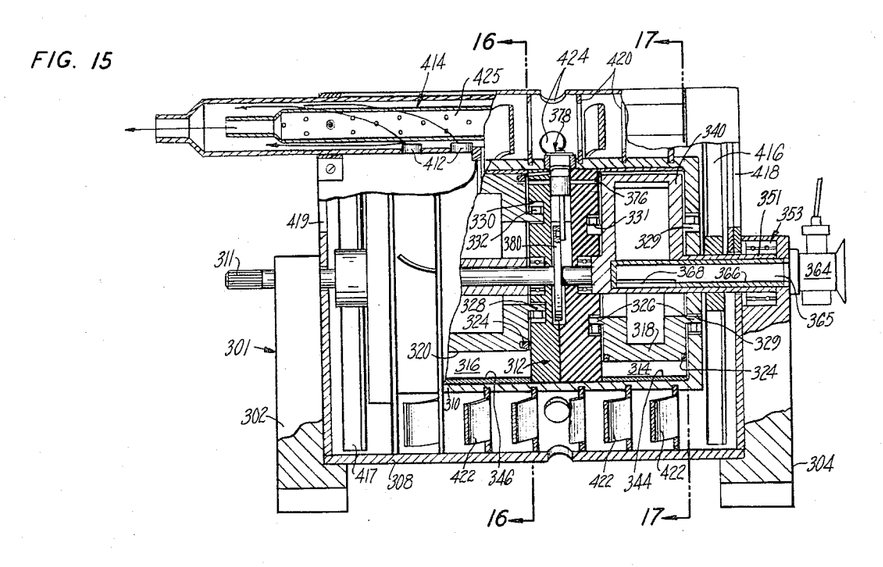
FIG. 15 is a longitudinal side elevation view, partly broken away and partly in section, of another embodiment of a rotary internal combustion engine incorporating the present invention.

A stationary casing 310 of generally cylindrical construction and having suitable end plates is secured within the housing 308 coaxially about an engine shaft 311 and is provided with an intermediate partition 312 to provide axially spaced charge and power chambers 314, 316, respectively. Suitable rotary pistons 318, 320 are rotatably mounted within the chambers 314, 316 eccentrically of the shaft 311 by axially extending generally cylindrical flanges 326, 328 which are received in cooperating annular slots 329, 330 and rotatably supported therein by suitable roller bearings 331, 332. The rotary pistons 318, 320 are provided with suitable sealing rings 324 for sealing engagement with the chamber side walls, and the chambers 314, 316 may be provided with axially extending replaceable wear plates 334, 336 for sealing engagement with the peripheral surface of the rotary pistons and which may be suitably maintained in sealing contact with the rotary pistons as by lubricant pressure.

Radial vanes 340, 342 (FIGS. 16 and 17) are fixed to the shaft 311 for dividing with the rotary pistons 318, 320 the charge and power chambers 314, 316 into induction and compression chambers and into combustion and exhaust chambers, respectively. For this reason, the chambers are provided with generally cylindrical wear liners 344, 346 which additionally function as spacers for the chamber side walls, and the vanes are provided with radially slideable seals 348, 350 adapted for sealing contact with the liners. The vanes 340, 342 are operatively connected with the rotary pistons 318, 320 by partially cylindrical socket bearing halves 358, 359 received within conforming partially cylindrical seats 360, 362 on the pistons and defining bearing slots for slideably receiving the vanes 340, 342. Accordingly, rotation of the shaft 311 and therefore the vanes 340, 342 is accompanied by simultaneous rotation of the pistons 318, 320 about their eccentric axes.

The intake system of the engine includes a carburetor 364 mounted on the end of the engine frame and an axial passage 365 in a sleeve 366 fixed to the stanchion 304 and extending coaxially within an integral sleeve 351 of the radial vane 340 rotatably mounted on the stanchion 304 by a bearing assembly 353. The sleeve 366 is slotted at 368 to provide an intake port adapted for registry with a generally radial passage 370 in the vane 340 having a generally circumferentially extending outlet 372 opening into the induction chamber. Due to the rotation of the vane 340, the fuel-air charge is supercharged or compressed as it passes through the radial passage 370 with a resulting increase in the volumetric efficiency of the induction phase of the engine cycle.

As with the embodiment of FIG. 1, a portion of the compressed charge of a preceding cycle is returned via a peripheral bypass groove 374 (FIG. 17) in the chamber liner 344 to the induction chamber to increase the temperature and turbulence of the combined charge and therefore the atomization of the fuel without simultaneously effecting a decrease in the volumetric efficiency of the induction system, it being understood that, as in the embodiment of FIG. 1, this compressed charge portion is returned to the induction chamber after the intake port has been closed and after the major portion of the charge has been transferred to the combustion chamber. The combined charge is subsequently compressed by the rotating vane 340 and is transferred in appropriate sequence to the combustion chamber via a passage 376 in the intermediate partition 312 and a transfer valve 378.

Figure 18:
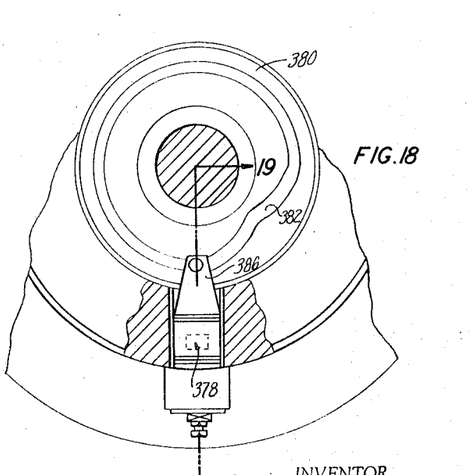
FIG. 18 is an enlarged transverse section view, partly broken away and partly in section, showing the transfer valve mechanism of the rotary internal combustion engine of FIG. 15.
Figure 19:
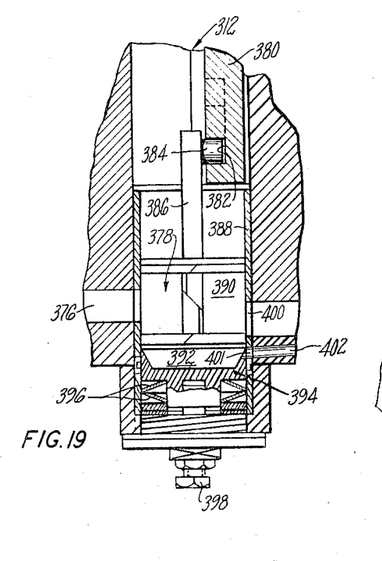
FIG. 19 is an enlarged fragmentary longitudinal section view taken substantially along line 19—19 of FIG. 18.

Referring now to FIGS. 18 and 19, a piston 390 of the transfer valve 378 is reciprocable within a cylindrical liner 388 mounted in a radial bore in the intermediate partition 312. The piston 390 is operated by a cam 380 fixed to the crankshaft and having a suitable camming slot 382 receiving a follower 384 rotatably mounted on a rod 386 fixed to the piston 390. The liner 388 has an inlet port aligned with the passage 376 for communication with the compression chamber 314 and axially spaced primary and secondary outlet ports 400, 401, respectively, in communication with the combustion chamber. The piston 390 is provided with suitable piston rings and with a frustoconical end 392 receivable within a conforming frustoconical recess in a cap 394. The cap is mounted for limited axial movement on the liner 388 and is urged to an extended position controlled by an adjustable limit screw 398 by a pair of opposed Belleville springs 396 which function to cushion the engagement of the piston with the cap 394. As with the embodiment of FIG. 1, a jet nozzle 402 in communication with the outlet port 401 is provided for discharging a high velocity charge just prior to ignition to increase the turbulence and thermal efficiency of combustion, and preferably in the zone of the spark plug 404.

Figure 16:
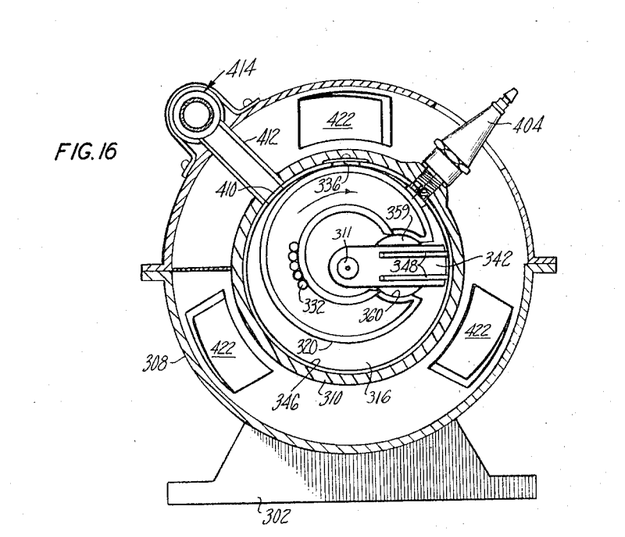
FIG. 16 is a transverse section view taken substantially along line 16—16 of FIG. 15.
Figure 17:
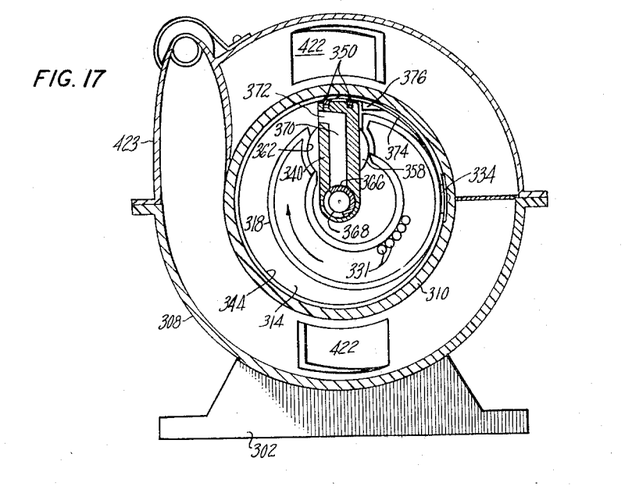
FIG. 17 is a transverse section view taken substantially along line 17—17 of FIG. 15.

Referring particularly to FIG. 16, after the vane 342 rotates past an opening 410 in the chamber liner 346 the gases of combustion are exhausted through an exhaust system including a radial conduit 412 connected to an axial exhaust conduit 414 mounted on the engine housing 308.

Engine cooling is provided by an intake impeller 416 fixed to the sleeve 351 of the vane 340 for drawing cooling air through an inlet opening 418 in the housing, by a plurality of axially spaced stationary fins 420 formed with integral air deflectors 422 for directing the cooling air generally helically about the casing 310, and by an expeller 417 fixed to the shaft 311 for discharging the cooling air through an outlet opening 419. A portion of the cooling air inducted by the intake impeller 416 is directed through a suitable conduit 423, shown integrally formed with the housing (FIG. 17), to the end of a perforated tube 425 located centrally within the exhaust conduit 414. This portion of the cooling air thereby combines with the exhaust to reduce the exhaust back pressure and the exhaust noise. Additionally, auxiliary openings 424 may be provided in the housing for providing independent cooling of the charge and power sections of the engine.

Figure 20:
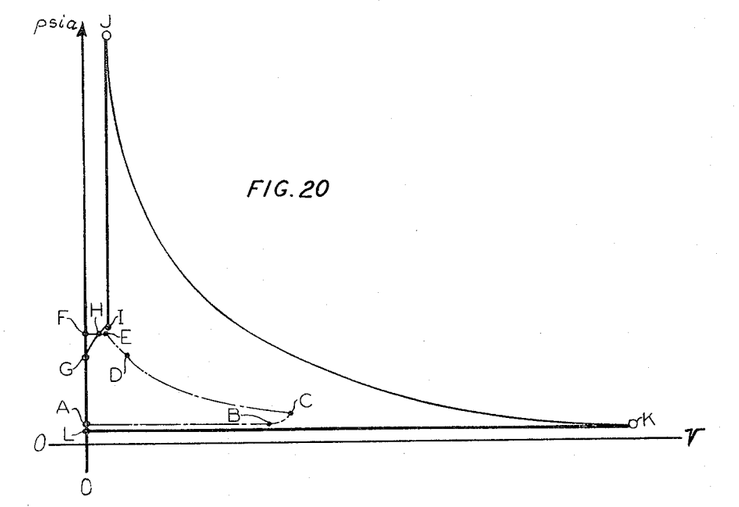
FIG. 20 is a coordinate representation of the thermodynamic cycle of the rotary internal combustion engines of FIGS. 1 and 15.

Referring now to FIG. 20, the thermodynamic cycle or process employed in the rotary internal combustion engine of the present invention is shown by a graph with pressure and volume coordinates and with a broken line representation of the induction and compression phases of the cycle occurring in the charge chamber of the engine, and with a full line representation of the combustion and exhaust phases of the cycle occurring in the power chamber of the engine.

Referring now to the induction and compression phases of the cycle represented by broken lines, the broken line AB represents the induction of the fuel-air charge into the induction chamber, the induction pressure being substantially constant and in the present example above atmospheric pressure due to supercharging or acceleration of the charge. The broken line BC represents the addition of the return charge portion of the compressed charge of the preceding cycle to form a combined charge of increased temperature and pressure. The broken line CDE represents the compression of the combined charge, with the broken line portion DE occurring while the work charge portion is being transferred from the compression chamber to the combustion chamber, which transfer is preferably accomplished with continuing compression of the charge, but is however accomplished at a reduced rate of compression due to the increasing volume of the combustion chamber with the result that the likelihood of auto-ignition is substantially reduced. Broken line EF represents the remaining charge in the compression chamber which is returned to the induction chamber for combination with the induced charge of the succeeding cycle.

Referring now to the combustion and exhaust phases of the cycle, the full ine GH represents the primary work charge transfer to the compression chamber, and the full line HI represents the auxiliary or secondary transfer resulting from the jet discharge into the combustion chamber. Ignition takes place preferably after the secondary transfer is completed, and the full line IJ therefore represents the pressure increase due to combustion. The full line JK represents the expansion of the high temperature and high pressure gas resulting from combustion and therefore the conversion of the energy of combustion into mechanical energy. The full line KL represents the exhaust phase at substantially atmospheric pressure, such being readily attainable by the engine of the present invention by appropriately relating the axial length of the power chamber with the axial length of the charge chamber. For example, in FIGS. 1 and 15 the axial length of the power chamber is shown to be substantially twice the axial length of the charge chamber.

Thus it can be seen that the rotary internal combustion engine of the present invention can be readily designed for any given compression ratio and for highly efficient expansion with exhaust at substantially atmospheric pressure. Additionally, the thermodynamic process of the present invention provides thermodynamically independent induction, compression, combustion and expansion, and exhaust phases providing super expansion of the gases of combustion, for returning a compressed charge portion of a preceding cycle for combination with an induced charge of a succeeding cycle to provide a combined charge of improved homogeneity, and for timely transfer of a charge from the compression chamber to the combustion chamber without compression losses and with maximum charge turbulence and homogeneity just prior to ignition. Further, the rotary internal combustion engine of the present invention incorporates a novel valving arrangement for appropriate sequencing of the phases of the thermodynamic cycle, a novel arrangement for maintaining optimum peripheral sealing engagement between the rotary pistons and the wall of their operating chambers, and an economical arrangement of parts providing a compact and reliable engine assembly.

As will be apparent to persons skilled in the art, various modifications and adaptations of the structure above described will become readily apparent without departure from the spirit and scope of the invention, the scope of which is defined in the appended claims.

I claim:

1. In an internal combustion engine of the type having separate charge and power chambers, pistons operable within the charge and power chambers for compressing a fuel-air charge and for converting the thermal energy of combustion of the charge into mechanical energy respectively, and valve means operable in synchronism with the pistons for timely transferring a compressed work charge from the charge chamber to the power chamber, the improvement wherein: the valve means comprises a valve chamber, a first valve chamber port in communication with the charge chamber, a second valve chamber port in communication with the power chamber, and a valve operable in the valve chamber between open and closed positions in synchronism with the pistons, said first and second ports being located so that the valve operates to first close off the first port and thereafter force a work charge portion remaining in the valve chamber through the second port.

2. The improvement of claim 1 further comprising a third valve chamber port in communication with the power chamber adapted for transferring a major portion of the work charge to the power chamber and further comprising a nozzle associated with the second port for directing the remaining portion of the work charge into the power chamber at a high velocity.

3. The improvement of claim 2 wherein a spark plug is provided for igniting the work charge in the power chamber and wherein the nozzle is located for directing the remaining portion of the work charge into the zone of the spark plug.

4. In an internal combustion engine of the type having separate compression and combustion chambers, first and second pistons operable within the compression and combustion chambers for compressing a fuel-air charge and for converting the thermal energy of combustion of the charge into mechanical energy respectively, a spark plug for igniting the charge in the combustion chamber, and valve means operable in synchronism with the pistons for transferring a compressed charge from the compression chamber to the combustion chamber, the improvement wherein the valve means provides for transferring a major portion of the charge while it is being compressed by the first piston and for subsequently discharging a remaining charge portion into the combustion chamber at a high velocity.

5. The improvement of claim 4 wherein the valve means is adapted to discharge the high velocity charge into the zone of the spark plug.

6. The improvement of claim 4 wherein the valve means comprises a valve piston operating chamber, a valve piston axially reciprocable within the operating chamber between a withdrawn open position and a forward closed position, an inlet port and a first outlet port for the valve chamber adapted to be closed off by the valve piston as it moves forwardly through a position intermediate its open and closed positions, and a second outlet port for the valve chamber for discharging the charge portion remaining in the valve chamber forward of the piston as the piston moves forwardly to its closed position from its said intermediate position.

7. The improvement of claim 6 further comprising a valve chamber cap having limited reciprocable movement within the chamber forwardly of the valve piston for engagement thereby, and spring means urging the cap toward the valve piston for cushioning the engagement of the valve piston with the cap.

8. The improvement of claim 7 wherein the valve piston and cap have conforming frustoconical engaging portions.

9. In a rotary internal combustion engine of the type having a casing with axially spaced chambers, rotatable pistons eccentrically mounted within the chambers, means including an axially extending pivot within the chambers operatively connecting the pistons to the casing and dividing the chambers into induction and compression chambers and combustion and exhaust chambers respectively, a spark plug for igniting the charge in the combustion chamber, and means for transferring a compressed charge from the compression chamber to the combustion chamber, the improvement wherein the pivot defines an axially extending cylindrical chamber and wherein the transferring means comprises an axially extending transfer tube mounted coaxially within the cylindrical chamber to define an annular chamber therebetween, an inlet port and a radial outlet port in the transfer tube, and a sleeve valve operable in said annular chamber for selectively closing off the outlet port.

10. The improvement of claim 9 further comprising primary and secondary outlet passages in the pivot providing communication between the annular chamber and the combustion chamber, said primary and secondary outlet passages adapted for transferring a major portion of the charge and, when the outlet port is closed off by the sleeve valve, for transferring the portion of the charge remaining in the annular chamber to the combustion chamber, respectively.

11. The improvement of claim 10 further comprising a nozzle associated with the secondary passage for discharging the remaining charge portion into the zone of the spark plug.

12. A rotary internal combustion engine comprising a stationary casing having axially spaced charge and power chambers, rotary pistons eccentrically mounted in the chambers respectively, an axially extending shaft within the casing, said shaft having radial vanes within the chambers operatively connected to the rotary pistons for common rotation therewith, said rotary pistons and radial vanes dividing the charge and power chambers into induction and compression chambers and combustion and exhaust chambers respectively, valve means operated by the shaft for sequentially transferring a compressed charge from the compression chamber to the combustion chamber, and a stationary intake conduit mounted coaxially within the charge chamber having a radial intake opening in communication with the induction chamber, said shaft having means for closing off the radial intake opening for controlling the induction interval.

13. The rotary internal combustion engine of claim 12 wherein the radial vane in the charge chamber has a generally radially extending intake passage with an outer end in communication with the induction chamber and an inner end in selective communication with the radial intake opening in the intake conduit.

14. In a rotary mechanism having a rotary piston supported for peripheral sealing engagement with a surface portion of its operating chamber, the improvement wherein: the piston support comprises a shaft with a pair of axially extending diametrically opposed flat parallel bearing surfaces, a piston journal sleeve received on the shaft having inwardly facing flat bearing surfaces in engagement with the flat bearing surfaces of the shaft for radial adjustment of the journal sleeve on the shaft, said shaft having a radial bore between the flat bearing surfaces and an axial passage in communication therewith, a piston reciprocable in the radial bore having an outer end engageable with the journal sleeve for radial adjustment thereof, and a torsion shaft within the axial passage having an abutment engageable with the inner end of the piston for biasing the piston outwardly, and means for angularly adjusting the torsion rod for varying the outward bias on the piston.

15. The improvement of claim 14 wherein the torsion shaft is provided with a lubricant passage for conveying lubricant to the piston support.

16. In a rotary mechanism of the type having a piston rotatably supported within an operating chamber for peripheral sealing engagement with a surface portion thereof, the improvement wherein: the piston support comprises a shaft with a pair of axially extending diametrically opposed flat bearing surfaces, a piston journal sleeve received on the shaft having inwardly facing flat bearing surfaces in engagement with the flat bearing surfaces of the shaft for radial adjustment of the journal sleeve on the shaft, said shaft having a radial bore between the flat bearing surfaces, a piston reciprocable in the radial bore having an outer end engageable with the journal sleeve for radial adjustment thereof, and means for urging the piston outwardly for radial adjustment of the journal sleeve.

17. A rotary internal combustion engine comprising an engine casing having axially spaced intake, charge and power chambers, an axially extending crankshaft within the casing having crank portions in the charge and power chambers and a plate within the intake chamber having a first intake opening, the casing having a second intake opening between the intake and charge chambers cooperating with the first intake opening to provide an intake passage to the charge chamber, a pair of rotary pistons rotatably mounted on the crank portions for operation within the charge and power chambers respectively, means operatively connecting the rotary pistons with the casing, and valve means operable by the crankshaft for transferring a charge from the charge chamber to the power chamber.

18. The rotary internal combustion engine of claim 17 wherein the crankshaft has an axial intake passage and radial passage means providing communication between the intake passage and the intake chamber and preventing pooling of the charge in the intake passage.

19. The rotary internal combustion engine of claim 17 further comprising an intake bushing axially reciprocable in one of the intake openings for sealing cooperation with the other intake opening, and a compression spring urging the intake bushing into sealing cooperation with said other intake opening.

20. The rotary internal combustion engine of claim 17 further comprising radial compressor vanes within the intake chamber operatively connected for compressing the charge within the intake chamber.

21. A rotary internal combustion engine comprising an engine casing having axially spaced charge and power chambers, a crankshaft within the casing having crank portions within the charge and power chambers respectively, rotary pistons rotatably mounted on the crank portions for operation within the charge and power chambers respectively, an axially extending pivot within the charge and power chambers fixed to the casing, means operatively connecting the pistons to the pivot allowing radial movement of the pistons relative to the pivot, said pivot having an axially extending transfer valve chamber therein, a transfer valve displaceable within the transfer valve chamber in opposite axial directions for respectively initiating and terminating transfer of a charge from the charge chamber to the power chamber, and fluid passage means between the valve chamber and the charge chamber providing for fluid pressure on the transfer valve urging the transfer valve in the axial direction terminating transfer.

22. In a rotary internal combustion engine having a casing with axially spaced charge and power chambers, a shaft coaxially mounted within the casing, a pair of rotary pistons operatively connected to the shaft for rotation within the charge and power chambers respectively, and valve means for transferring a charge from the charge chamber to the power chamber, the improvement wherein: the casing has a radial valve bore intermediate the charge and power chambers, and wherein the valve means comprises a valve piston radially reciprocable within the valve bore between open and closed positions, valve piston operating means operatively connected to the shaft, a valve bore inlet port in fluid communication with the charge chamber, and a valve bore outlet port in fluid communication with the power chamber, said inlet and outlet ports being radially spaced so that the valve piston in moving from its open to its closed position first closes off the inlet port and thereafter closes off the outlet port.

23. In a rotary internal combustion engine of the type having a rotatable casing with axially spaced charge and power chambers, a crankshaft mounted coaxially within the casing having crank portions within the chambers respectively, a pair of rotary pistons rotatably mounted on the crank portions for operation in the charge and power chambers respectively, and means operatively connecting the rotary pistons to the casing for common rotation therewith, the improvement wherein: the casing comprises a cylindrical housing, an axially removable generally cylindrical separator received within the housing for separating the charge and power chambers and for providing inner radially extending walls therefor, means providing outer radially extending walls for the charge and power chambers including at least one detachable end plate, and partially cylindrical wear liners closely received within the housing providing spacers between the inner and outer radially extending walls of the charge and power chambers having substantially line sealing engagement with the rotary pistons.

24. In a rotary internal combustion engine of the type having a casing with a generally cylindrical operating chamber, a generally cylindrical piston rotatably mounted eccentrically within the operating chamber for peripheral substantially line sealing engagement with the casing, and means for operatively connecting the casing and the piston including a vane pivotally connected to the casing and slideably received within a generally radial slot in the piston, the improvement wherein: the piston has an integral outwardly convex surface and the radial vane has a cooperating inwardly concave surface engageable by the convex surface for smooth withdrawal of the piston from and return of the piston into sealing engagement with the casing as the line of sealing engagement approaches and recedes from the generally radial slot in the piston.

References Cited by the Examiner

UNITED STATES PATENTS

| | | | |
|---|---|---|---|
| 1,146,848 | 7/1915 | Clark | 123—8 |
| 1,155,794 | 10/1915 | Clark | 123—8 |
| 1,401,126 | 12/1921 | Aust | 123—16 |
| 1,501,596 | 7/1924 | Guttner | 230—147 |
| 1,670,953 | 5/1928 | Browne | 123—16 |
| 1,961,592 | 6/1934 | Muller | 103—132 |
| 2,037,450 | 4/1936 | Bancroft | 123—16 |
| 2,113,601 | 4/1938 | Pratt | 123—1 |
| 2,249,997 | 7/1941 | Wydler | 123—1 |
| 2,295,117 | 9/1942 | Koester | 123—8 |
| 2,682,258 | 6/1954 | Udelman | 123—16 |
| 2,878,793 | 3/1959 | Birk | 123—17 |
| 2,966,898 | 1/1961 | Rydberg et al. | 123—16 |

FOREIGN PATENTS

| | | |
|---|---|---|
| 393,156 | 6/1933 | Great Britain. |
| 133,801 | 12/1951 | Sweden. |

MARK NEWMAN, *Primary Examiner.*

SAMUEL LEVINE, *Examiner.*

A. S. ROSEN, F. T. SADLER, *Assistant Examiners.*